US007782902B2

(12) United States Patent
Deerman et al.

(10) Patent No.: US 7,782,902 B2
(45) Date of Patent: Aug. 24, 2010

(54) APPARATUS AND METHOD FOR MAPPING OVERLAPPING INTERNET PROTOCOL ADDRESSES IN LAYER TWO TUNNELING PROTOCOLS

(75) Inventors: James Robert Deerman, Allen, TX (US); Milton Andre Lie, McKinney, TX (US); Aswinkumar Vishanji Rana, Plano, TX (US); Robert Daniel Maher, III, Plano, TX (US)

(73) Assignee: Audiocodes, Inc., Plano, TX (US)

( * ) Notice: Subject to any disclaimer, the term of this patent is extended or adjusted under 35 U.S.C. 154(b) by 1079 days.

(21) Appl. No.: 10/890,888

(22) Filed: Jul. 14, 2004

(65) Prior Publication Data

US 2006/0013211 A1    Jan. 19, 2006

(51) Int. Cl.
*H04J 3/16* (2006.01)
*H04J 3/22* (2006.01)
*G06F 15/173* (2006.01)

(52) U.S. Cl. ...................... 370/469; 709/238
(58) Field of Classification Search ............... 370/389, 370/351–353, 357, 399, 465, 469; 709/238, 709/243
See application file for complete search history.

(56) References Cited

U.S. PATENT DOCUMENTS

| | | | | |
|---|---|---|---|---|
| 5,991,299 | A * | 11/1999 | Radogna et al. | 370/392 |
| 6,389,479 | B1 * | 5/2002 | Boucher et al. | 709/243 |
| 6,708,219 | B1 * | 3/2004 | Borella et al. | 709/245 |
| 6,993,595 | B1 * | 1/2006 | Luptowski et al. | 709/245 |
| 7,120,151 | B1 * | 10/2006 | Ginjpalli et al. | 370/395.1 |
| 7,274,684 | B2 * | 9/2007 | Young et al. | 370/352 |
| 7,334,049 | B1 * | 2/2008 | Somasundaram et al. | 709/245 |
| 2002/0087721 | A1 * | 7/2002 | Sato et al. | 709/238 |
| 2002/0186698 | A1 * | 12/2002 | Ceniza | 370/401 |
| 2003/0058839 | A1 * | 3/2003 | D'Souza | 370/352 |
| 2003/0093563 | A1 | 5/2003 | Young et al. | |
| 2003/0145104 | A1 * | 7/2003 | Boden et al. | 709/238 |
| 2003/0158962 | A1 | 8/2003 | Keane et al. | |
| 2004/0037260 | A1 * | 2/2004 | Kakemizu et al. | 370/338 |
| 2005/0086495 | A1 * | 4/2005 | Sheth et al. | 713/182 |
| 2005/0152336 | A1 * | 7/2005 | Bratt et al. | 370/352 |
| 2005/0152399 | A1 * | 7/2005 | Chu et al. | 370/469 |
| 2005/0249241 | A1 * | 11/2005 | Farnsworth et al. | 370/469 |
| 2007/0058642 | A1 * | 3/2007 | Eisink | 370/401 |

OTHER PUBLICATIONS

Srisuresh, P., Holdrege, M.; RFC 2663—IP Network Address Translator (NAT) Terminology and Considerations—Aug. 1999, retrieved from http://tools.ietf.ord/html/rfc2663 on Feb. 28, 2009.*
Kim et al., "Dynamic VLAN Registration Mechanism on EoMPLS", IEEE 2003, pp. 208-212.
International Search Report and Written Opinion for PCT/US2005/024773, dated Oct. 6, 2005.

* cited by examiner

*Primary Examiner*—Seema S Rao
*Assistant Examiner*—Xavier Szewai Wong
(74) *Attorney, Agent, or Firm*—Haynes and Boone, LLP

(57) ABSTRACT

A method and system are described for resolving problems created by implementing multiple networks using private IP addresses and layer two tunneling protocols is described. A network processing system is operable to map flows from private IP addresses and ports on layer two tunneling protocol networks to public IP addresses and ports using the private IP addresses and ports and identifiers for the layer two tunneling protocol network. The network processing system uses its own public IP addresses and ports to anchor the traffic from the private network and performs the required mapping to pass traffic between the public and private networks.

14 Claims, 6 Drawing Sheets

APPARATUS AND METHOD FOR MAPPING OVERLAPPING INTERNET PROTOCOL ADDRESSES IN LAYER TWO TUNNELING PROTOCOLS

TECHNICAL FIELD OF THE INVENTION

The present invention relates to broadband data networking equipment. Specifically, the present invention relates to a network processing system that allows non-unique private Internet Protocol ("IP") addresses from one or more private IP networks to be mapped into addresses usable on the public IP network.

BACKGROUND OF THE INVENTION

Internet Protocol (IP) addresses are names that uniquely identify a device on the Internet. To insure uniqueness, IP version 4 (IPv4) addresses were defined as unsigned 32 bit values, which yield 4.29 billion possible public addresses. Certain organizations were tasked with managing the Internet's address space. Their responsibility is to know who is using specific IPv4 addresses at any point in time. It is also their responsibility to ensure that not more than one entity is using the same IPv4 address at any given point in time. There is one group of IPv4 addresses that do not fall under the jurisdiction of these addressing authorities, those being private IPv4 addresses. There are three categories of IPv4 addresses, which have been reserved for private usage: 10.0.0.0/8 (Class A—16.7M addresses), 172.16.0.0/16 (Class B—65.5 k addresses), and 192.168.0.0/24 (Class C—256 k addresses). These addresses may be freely used by any organization. The one disadvantage to using these private addresses is that they may not be used for connectivity over the public Internet, since they could be being used by multiple entities on the Internet.

Unfortunately, the current number of addresses allowed under IPv4 is not enough for the explosive growth of the Internet. One solution to the problem of address scarcity is to use a new addressing scheme. IP version 6 (IPv6) allows for the network to have 128 bit Internet addresses, which yield 34*10^38 possible addresses.

While this is a great improvement over IPv4, implementing IPv6 requires drastic infrastructure overhauls and is not a feasible short-term solution (all future references to IP will imply IPv4).

As a result of the lack of sufficient IP addresses, and the use by many enterprise networks of the private address space within the enterprise network, is that most enterprise networks make use of IP addresses that overlap with addresses in other enterprise networks or even within the virtual private network of the enterprise itself. Virtual private networks ("VPNs") and virtual local area networks ("VLANs") were developed to allow companies with multiple physical locations to create a single enterprise network that is transparent to the user. This is accomplished by the enterprise turning over much of the network infrastructure to carriers, such as MCI, AT&T, Southwestern Bell, etc., who connect the remote locations across their own private networks.

To make a VPN, or VLAN (reference to one will hereinafter imply a reference to the other) work since there can be overlapping IP addresses used among the different VPNs being hosted by the carrier or even at the individual physical locations, information identifying the particular VPN being used must be added to the layer two information inside the packet which includes the source address and port information. In order, however for the private addresses to be used across the public internet ("Internet") Network Address Translation (NAT) and Network Address Port Translation (NAPT) must be used. These functions provide the mechanism to translate private IP addresses to public IP addresses for Internet connectivity.

There are two methods of performing address translation: NAT and NAPT.

NAT performs a 1-to-1-address mapping, for example:

| Internal IP | External IP |
| --- | --- |
| 10.10.108.70 | 65.24.212.70 |

NAT was developed solely for routing and security purposes where two or more IP addresses cannot be represented by a single network/subnet mask if they are not contiguous. This necessitates more than one route entry to describe the network. If the operator owns the non-contiguous space but does not wish to readdress the network they can use NAT to make the networks appear contiguous. This would allow the route entries to be compressed to a single subnet entry. One attribute of NAT is the hiding internal IP addresses. Since NAT provides translations on all private IP addresses, they will never be exposed to the outside world through the IP header. Some network operators use this as a security mechanism and can be called topology hiding.

The issue of address scarcity is addressed with NAPT. NAPT allows many private IP addresses to be represented as a single public IP address. Network owners must still own public IP addresses, but they can drastically reduce the number of public IP addresses they must own by using a NAPT device in their network. A NAPT device can typically be found where the private network is connected to a public router interface. A NAPT device usually is assigned with one or more public IP addresses. The NAPT device will use these public IP addresses to translate all of the private IP addresses.

Most IP traffic is in the form of request/response protocols, a client asks for some information and a server responds with the information in question. NAPT devices use this behavior for the address translation operation. The NAPT operation can be described as follows:

1. client sends request,
2. client request gets source IP address and port translated by NAPT device,
3. server responds to request by sending packets to IP address and port assigned by NAPT device.
4. NAPT device receives response and translates the destination IP address and port to the proper private IP address and port, and finally the client receives response and renders information to the user.

A NAPT device must provide translation for both the request and the response packets. A table is used to maintain the translation information. The NAPT translates the request packet and then stores the external IP and port combination used in the table. Response packets are then indexed against this table in order to find the actual internal IP address and port combination, for example:

| Src IP | Dst IP | Src Port | Dst Port | Ext IP | Ext Port |
| --- | --- | --- | --- | --- | --- |
| 10.10.108.80 | 12.14.128.71 | 40123 | 80 | 65.30.128.7 | 10022 |
| 10.10.108.71 | 212.24.30.12 | 10112 | 80 | 65.30.128.7 | 10023 |

Protocols that include IP address and port information in their message payloads can be adversely affected by the use of NAPT. There are several VoIP protocols that are designed with two main components: signaling and bearer. These protocols are H.323 and H.248, Media Gateway Control Protocol (MGCP) and Session Initiation Protocol (SIP). The signaling protocol is a separate session from the media, or voice, stream and includes in its payload (as opposed to its header) an IP address and port destination of where to send the media stream while the media (voice) will be carried using Real Time Protocol (RTP). Since most NAPT devices do not look at, much less alter, the contents of the IP payload, the indicated IP address and port for the media stream contained in a signaling packet will be ignored by the NAPT device and the media will not be able to pass through the device.

In addition to NAT/NAPT devices, Firewalls also present a problem for peer-to-peer communications such as VoIP. Firewalls provide security for computer networks by filtering out malicious traffic. There are two types of filtering methods: static rules that are called Access Control Lists (ACL), and request derived rules. A standard firewall will implicitly deny traffic. In order for a packet to cross a firewall it must match an allow rule in the firewalls filter rule set. The ACL is a user-provisioned rule that specifies the endpoints that are allowed to communicate. The following ACL shows two entries that could be provisioned to allow traffic between the indicated IP addresses:

| Src IP | Dst IP | Src Port | Dst Port |
|---|---|---|---|
| 65.24.212.70 | 212.24.30.12 | * | 5060 |
| 212.24.30.12 | 65.24.212.70 | 5060 | * |

Request derived rules are more explicit than ACL rules. A request-derived rule works in a similar manner as NAPT. The firewall has a trusted and un-trusted side (private and public side). These rules are generated by protocol requests that are initiated from the trusted side. A signature (IP address and port information) is stored in a table. Packets that arrive on the un-trusted side are assumed to be responses to requests. If a signature in the table corresponds to the packet, then the packet is assumed to be trusted and is allowed to cross the trust boundary. Each entry also contains a timestamp of the last activity. The signature will be removed from the table if the timestamp becomes older than a predefined amount of time (1-5 minutes).

Request derived rules present similar problems to those encountered with NAPT devices. Again, a network device makes the assumption that all traffic is client-server and will be initiated from a particular side of the device. With VoIP as a peer-to-peer protocol it will not work properly in this environment. A signaling packet, which originates from the un-trusted side, will not match a request-derived rule. ACL(s) can be used to manage inbound signaling, but scale issues can affect the manageability of such a solution and create a large security issue. The largest issue arises from the media that is sent from the un-trusted side of the network. The information that would be used to make a signature for this packet was contained in the payload of a signaling packet that crossed the firewall. Signatures are only generated on information in the header of the packet. Since the IP address and port information are encoded within the payload, a signature will never be created. ACL(s) cannot easily solve this problem, because the ports used for media traffic are dynamically assigned.

Based on the traditional operation of NAT/NAPT devices and the use of private IP addresses in layer two tunneling protocol networks like VPNs and VLANs, real time multimedia communications, especially those that include address information in the payload cannot work across multiple VPNs or VLANs, and cannot connect to a routed IP network such as the public Internet.

Accordingly, what is needed is a method and device for resolving the conflict of overlapping private IP addresses across multiple layer two tunneling protocol networks and to the public IP network.

SUMMARY OF THE INVENTION

The present invention provides a simple solution to interconnect enterprise and service provider private and public networks that ensures open IP Communications without compromising network integrity. The present invention overcomes limitations of layer two tunneling protocol networks using private IP addresses face when two way multimedia communications, such as voice-over-IP, are involved.

The present invention describes a method for resolving overlapping IP addresses where flows received from a private IP address and port on a layer two tunneling protocol network are mapped to a public IP address and port by a network processing system using the private IP address and port, and identifying information or the layer two tunneling protocol network. The mapping can be performed in an application running on the network processing system by routing the associated flow around the layer two and layer three software functions, or the layer two and layer three software functions can be modified to preserver the identifying information and perform the mapping.

The present invention also describes a network processing system having one or more processors that, singly or in combination run layer two, layer three and application processing functions, wherein the functions are operable to map flows from private IP addresses and ports on layer two tunneling protocol networks to public IP addresses and ports using the private IP addresses and ports and identifying information for the layer two tunneling protocol network. As before, the mapping may be done by the application by routing the associated flows around the layer two and layer three functions, or the layer two function may be modified to retain the identifying information, such that the layer three function can perform the mapping.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1:
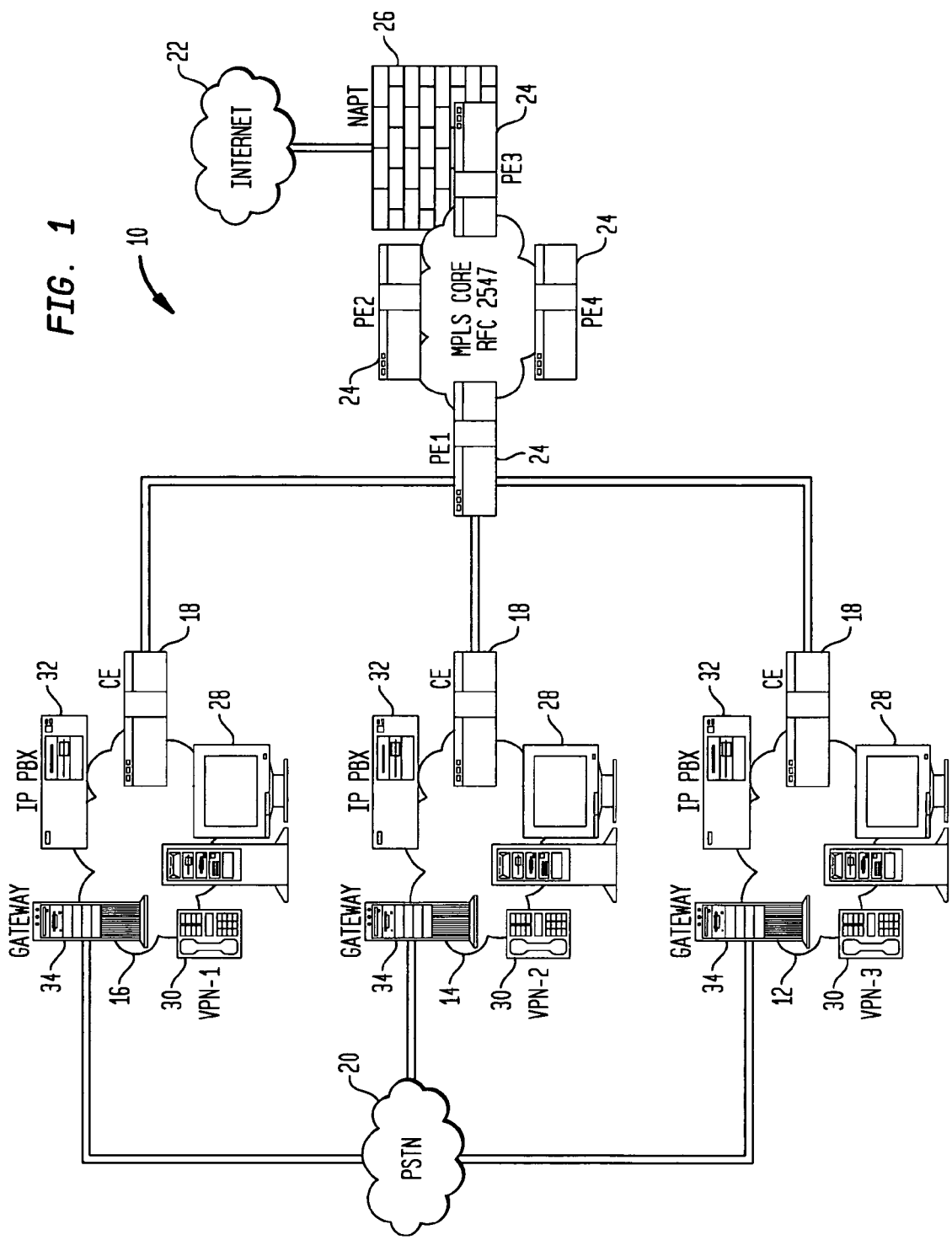
FIG. 1a is a simplified diagram of a prior art enterprise virtual private network.

Referring now to FIG. 1, a simplified network diagram is presented showing prior art architecture 10. Virtual private networks VPN-1, VPN-2 and VPN-3, also referred to as enterprise networks 12, 14, and 16, represent typical enterprise network installations using private IP addresses for internal terminals 28 and VoIP phones 30. IP PBXes 32 handle VoIP traffic for the enterprise, and connect to gateways 34 which interconnect each enterprise voice network to the public switched telephone network ("PSTN") 20. Data on enterprise networks 12, 14, and 16 is routed through customer edge routers 18 into carrier network 18 through the carrier's provider edge routers 24. Carrier network 18 employs layer two tunneling protocols such as multi-label protocol switching which adds information identifying the particular VPN to the layer two data in the IP flows inside carrier network 18, thereby eliminating the need for NAT or NAPT within carrier network 18. Data from enterprises 12, 14, or 16 intended for the public network, or Internet, 22 must pass through a NAT/NAPT device 26 to have the private IP addresses used on the VPNs changed to public addresses routable on public network 22.

Network 10 provides multiple problems for peer-to-peer, or real-time applications such as voice-over-IP that include IP address and port information in their message payloads. The private addressing scheme of the VPN is not routable outside of the VPN. To connect to another IP network such as the Internet, NAT/NAPT router 26 is required to map the private VPN IP address to a public IP, or layer three, address which is then routable on any other IP network. This scheme, described by RFC 1631 of the Internet Engineering Task Force ("IETF"), works very well for data applications, but as said, does not work for protocols with address information in their payload, such as session initiation protocol ("SIP"), IP voice protocol H.323, or media gateway control protocol ("MGCP").

NAPT devices do not examine or alter the payload information of the packets they process. As a result passing protocols, such as those VoIP protocols listed, with address information in the payload through a NAPT device result in return communications dependent on the private IP address in the payload for processing being undeliverable, because the network routers will be unable to process the private address used by the return flow.

Compounding the NAT problem is the fact that it is very common for voice VPN networks utilizing private IP addressing schemes to have overlapping IP addresses. For example VPN-1 and VPN-2 can have IP phone with the same private IP address. While routing that IP address within VPN-1, for example, is not a problem, trying to route that IP address to VPN-2 presents a problem since there is no way of knowing outside of VPN-2 where that private address would end up, if anywhere. Trying to map the private addresses to public addresses for routing between VPN-1 and VPN-2 results in the same problems described above in relation to NAPT devices.

While the problems with private addressing schemes are being described with relation to VoIP traffic and protocols, one skilled in the art will understand that the same problems will occur with any layer two tunneling protocol, that carries tunneling identifying information in the layer two headers, which is stripped by layer two processing functions or stacks, and not usable by layer three processing functions or stacks.

Figure 2:
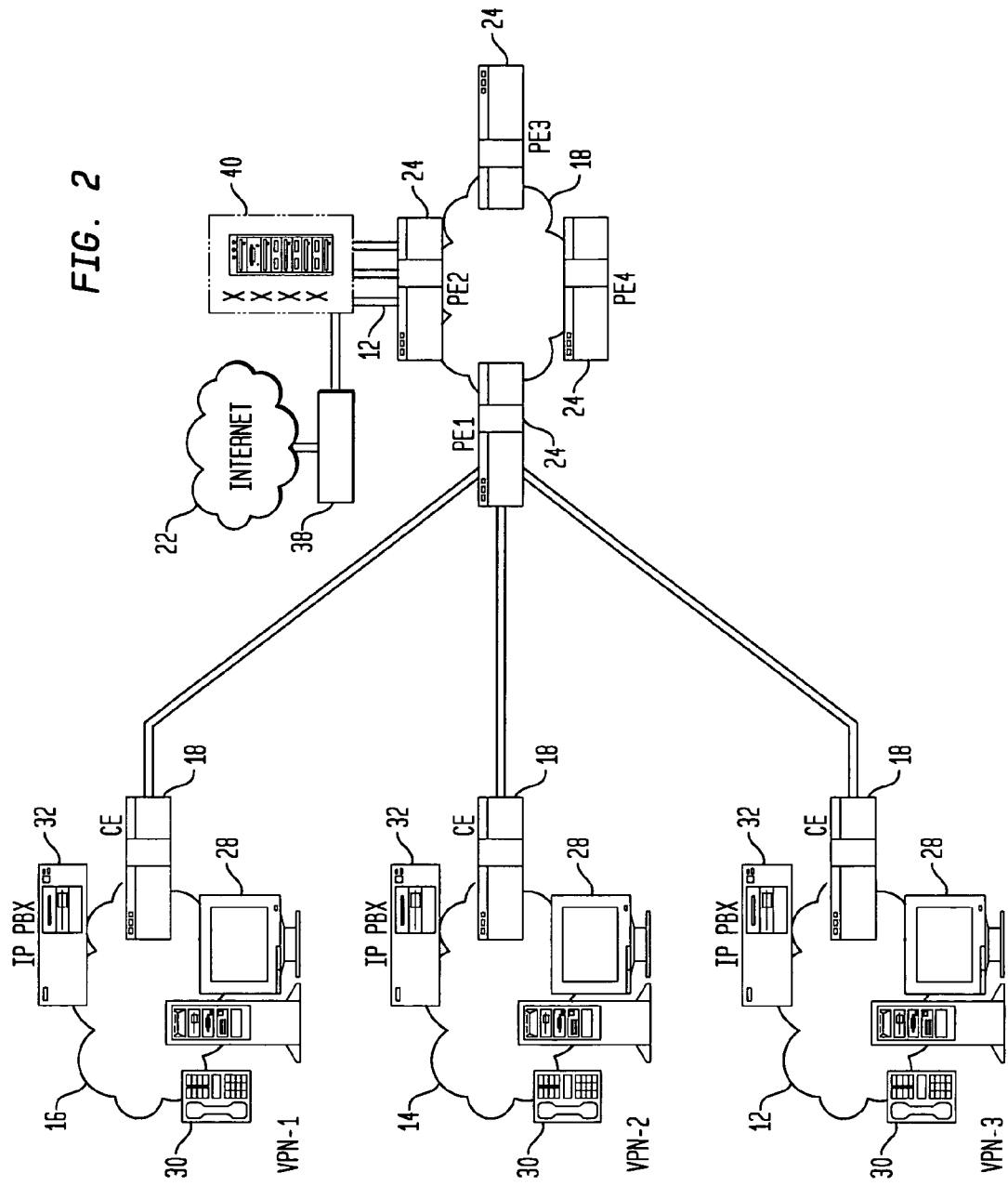
FIG. 2 is a simplified network diagram illustrating a network structure implementing the network processing system according to the present invention.

Referring now to FIG. 2, a simplified network diagram showing a network implemented with a network processing system, which can be a session controller, which alleviates the problems described with reference to FIG. 2. Network 50 again includes enterprise networks 12, 14, and 16 (VPN-1, VPN-2, and VPN-3), which connect to carrier network 18 over customer edge routers 18 and provider edge routers 24. Network processing system 40 interfaces to one or more provider edge routers in carrier network 18. Network processing system 40 provides carrier network 18 with secure protocol aware session, or flow, based NAPT, hosted VoIP firewall, session admission control, and session detail records for real time multi-media communications such as VoIP. Using network processing system 40 allows for VPNs on carrier network 18 to interact directly eliminating the need for gateways and the PSTN from FIG. 1. Additionally, network processing system 40 provides for anchoring and protocol aware NAPT, thereby allowing multiple VPNs, even with overlapping IP addresses to connect with the public internet 22 using router 38.

Network processing system 40 connects to the provider edge router using interfaces 42, which can be gigabit Ethernet interfaces. By setting a tag, such as an 802.1q VLAN tag, using the provider edge router, network processing system 40 is able to support overlapping IP addresses used in the VPNs on carrier network 18 using a virtual interface. Each VPN uses a unique virtual interface to the network processing system, which allows the network processing system to act as an outbound proxy for each VPN. In the case of SIP, for example, the network processing system becomes a SIP proxy, and provides anchoring, and registration binding for all SIP sessions on the VPNs. The anchoring places network processing system 40 in the signaling and media path for all VoIP traffic. Network processing system 40 also serves as a firewall protecting the VPNs from security threats on the network.

Network processing system 40 is able to provide NAPT functionality for higher layer protocols, such as VoIP protocols because it is able to provide NAPT not only on header information, but also on address field in the message payloads, such as those used by SIP and H.323. The network processing system has a virtual network that contains a pool of registered public IP addresses to interconnect all virtual interfaces in the system. When a flow arrives on a virtual interface, the network processing system requests a public address and port from the pool and translates the VPNs private IP address and port to the assigned public address and port allowing the flow to be routed to any public address on the carrier network 18 or the public network 22. The network processing system creates a pin hole in the firewall for the duration of the flow to allow the associated return flow to pass through the firewall. Once the flow is finished the pinhole is closed and the network processing system returns the public IP address and port back to the pool.

Another problem with VoIP arises when an inbound call is intended for an IP phone or terminal on a VPN with a private, and unroutable, IP address. There must be a mechanism for the inbound traffic to discover the private IP address of the IP phone where the INVITE must be routed. The private address can always be statically provisioned, but static addressing is complicated to manage, does not scale well (on the carrier and enterprise side), and eliminates some of the key features of VoIP. In order to support dynamic private addressing, the IP phones must support the SIP REGISTER method. REGISTER provides a mechanism to learn the current address of a particular global name (i.e. sip: +12145551000, 10.10.108.10). In this scenario the IP phones will again use the network processing system 40 from FIG. 2 as the outbound proxy, which forces all SIP requests through the network processing system.

The phones will register with a Registrar behind the network processing system within the carrier network, and then the network processing system will modify the required fields within the REGISTER request. The Contact header, which specifies the current address being used by the phone, will be modified to an IP address and port pair managed by the network processing system. The old value of the Contact header will be stored for use with routing INVITE(s) associated with this registration. When the network processing system receives the INVITE to an IP address and port that was inserted in a registration it can lookup the private IP address and port of the destination IP phone. The network processing system can then place the INVITE on the correct secured connection directed to the correct private IP address, which will result in the proper IP phone being contacted.

Figure 3:
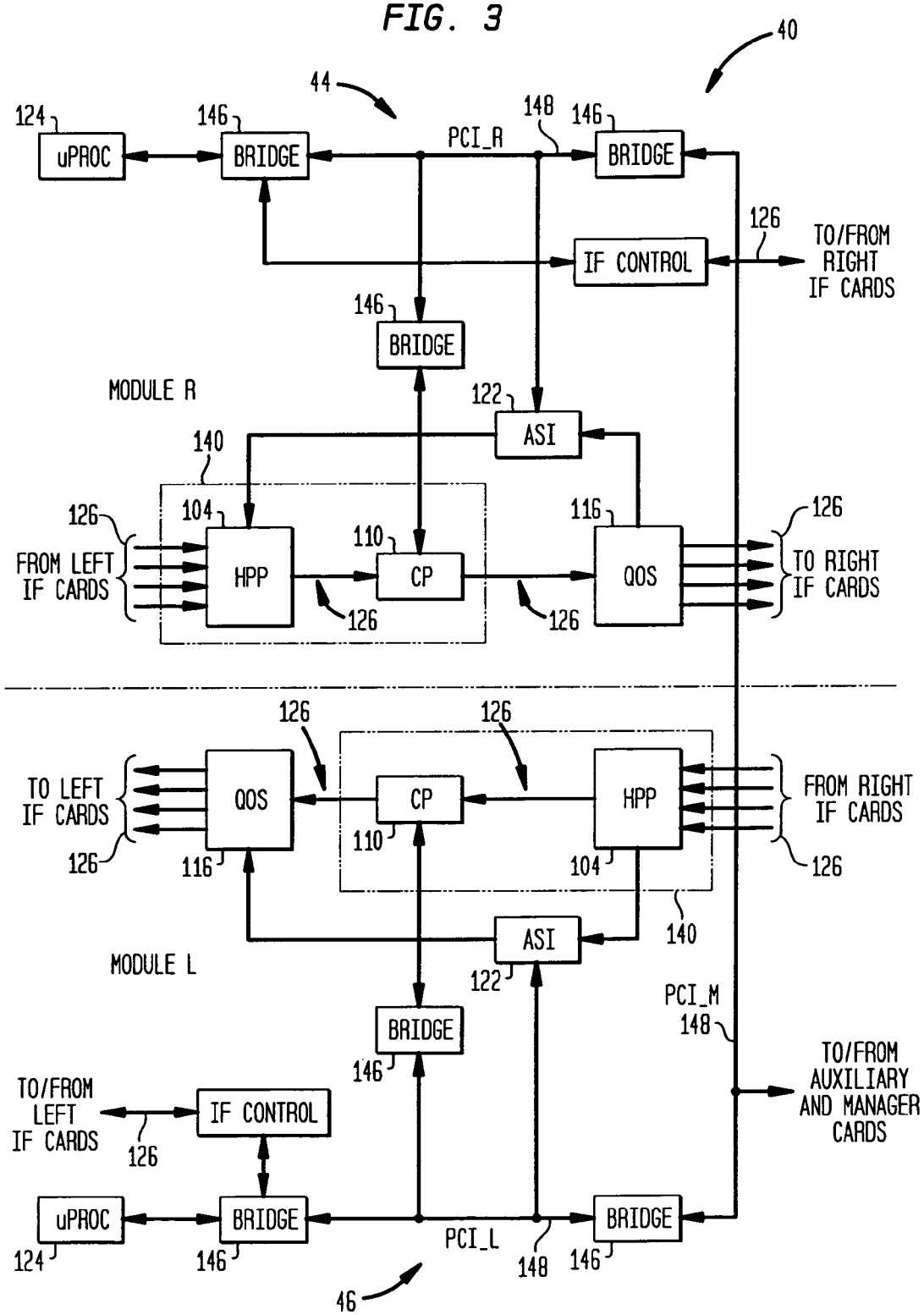
FIG. 3 is a block diagram of a network processing system in accordance with the present invention.

Referring now to FIG. 3, an example of a network processing system in accordance with the description of network processing system 40 of FIG. 2 is shown. Network processing system 40 includes two processing engines 44 and 46. Each of the processing engines is identical, and the operation of each will be discussed generally and any description of the operation of one processing engines will apply equally to both. Line interfaces, not shown, take the data from the physical ports, frames the data, and then formats the data for placement on fast-path data bus 126 which, as described, is preferably an industry standard data bus such as a POS-PHY Level 3, or an ATM UTOPIA Level 3 type data bus.

Fast-path data bus 126 feeds the data to traffic flow scanning processor 140, which in the preferred embodiment includes header preprocessor 104 and content processor 110, but can be a single processor such as the Intel IXP family of network processors. The data is first sent to header preprocessor 104, which is operable to perform several operations using information contained in the data packet headers. Header preprocessor 104 stores the received data packets in a packet storage memory associated with header preprocessor 104, and scans the header information. The header information is scanned to identify the type, or protocol, of the data packet, which is used to determine routing information and to decode the IP header starting byte.

After data packets have been processed by header preprocessor 104 the data packets, and any conclusion formed by the header preprocessor, such as QoS information, are sent on fast-data path 126 to the other half of traffic flow scanning engine 140, content processor 110. The received packets are stored in packet storage memory (not shown) while they are processed by content processor 110. Content processor 110 is operable to scan the contents of data packets received from header preprocessor 104. The header is scanned as well, one goal of which is to create a session id using predetermined attributes of the data packet.

In the preferred embodiment, a session id is created using session information consisting of the source address, destination address, source port, destination port and protocol, although one skilled in the art would understand that a session id could be created using any subset of fields listed, or any additional fields in the data packet, without departing from the scope of the present invention. When a data packet is received that has new session information the header preprocessor creates a unique session id to identify that particular traffic flow. Each successive data packet with the same session information is assigned the same session id to identify each packet within that flow. Session ids are retired when the particular traffic flow is ended through an explicit action, or when the traffic flow times out, meaning that a data packet for that traffic flow has not been received within a predetermined amount of time. While the session id is discussed herein as being created by the header preprocessor 104, the session id can be created anywhere in traffic flow scanning engine 140 including in content processor 110.

The contents of any or all data packets are compared to a database of known signatures, and if the contents of a data packet, or packets, match a known signature, an action associated with that signature and/or session id can be taken by the processing engine. Additionally, content processor 110 is operable to maintain state awareness throughout each individual traffic flow. In other words, content processor 110 maintains a database for each session which stores state information related to not only the current data packets from a traffic flow, but state information related to the entirety of the traffic flow. This allows network processing system 40 to act not only based on the content of the data packets being scanned but also based on the contents of the entire traffic flow.

Once the contents of the packets have been scanned and a conclusion reached by traffic flow scanning engine 140, the packets and the associated conclusions of either or both the header preprocessor 104 and the content processor 110 are sent to quality of service (QoS) processor 116. QoS processor 116 again stores the packets in its own packet storage memory for forwarding. QoS processor 116 is operable to perform the traffic flow management for the stream of data packets processed by network processing system 40. QoS processor contains engines for traffic management, traffic shaping and packet modification.

QoS processor 116 takes the conclusion of either or both of header preprocessor 104 and content processor 110 and assigns the data packet to one of its internal quality of service queues based on the conclusion. The quality of service queues can be assigned priority relative to one another, or can be assigned a maximum or minimum percentage of the traffic flow through the device. This allows QoS processor 116 to assign the necessary bandwidth to traffic flows such as VoIP, video and other flows with high quality and reliability requirements, while assigning remaining bandwidth to traffic flows with low quality requirements such as email and general web surfing to low priority queues. Information in queues that do not have the available bandwidth to transmit all the data currently residing in the queue according to the QoS engine is selectively discarded, thereby removing that data from the traffic flow.

The QoS queues in QoS processor 116 (there are 64 k queues in the present embodiment of the QoS processor, although any number of queues could be used) feed into schedulers (1024 in the present embodiment), which feed into logic ports (256 in the present embodiment), which send the data to flow control port managers (32 in the present embodiment) which can correspond to physical egress ports for the network device. The traffic management engine and the traffic shaping engine determine the operation of the schedulers and logic ports in order to maintain traffic flow in accordance with the programmed parameters.

QoS processor 116 also includes a packet modification engine, which is operable to modify, add, or delete bits in any of the fields of a data packet. This allows QoS processor 116 to change DiffServ bits, or to place the appropriate MPLS shim, or VLAN tag on the data packets for the required treatment. The packet modification engine in QoS processor 116 can also be used to change information within the payload itself if necessary. Data packets are then sent along fast-data path 126 to output to the associated line interfaces, where it is converted back into an analog signal and placed on the network.

As with all network equipment, a certain amount of network traffic will not be able to be processed along fast-data path 126. This traffic will need to be processed by on-board microprocessor 124. The fast-path traffic flow scanning engine 140 and QoS processor 116 send packets requiring additional processing to flow management processor 122, which forwards them to microprocessor 124 for processing. The microprocessor 124 then communicates back to traffic flow scanning engine 140 and QoS processor 116 through flow management processor 122. Traffic flow scanning engine 140 is also operable to collect data and statistics on the nature of the traffic flow through the processing engine 40. Bridges 146 are used between elements to act as buffers on PCI buses 148 in order to prevent the loss of data that could occur during a flood of the PCI bus.

As can be seen from the description of FIG. 3, learning state machines 44 and 46 allow the entire contents of any or all data packets received to be scanned against a database of known signatures. The scanned contents can be any variable or arbitrary length and can even cross packet boundaries. The abilities of learning state machines 44 and 46 allow the construction of a network device that is intelligent and state-aware, and gives the network device the ability to operate on data packets based not only on the contents of that data packet, but also on the contents of previous data packets from the same flow.

Some of the functions associated with network processing system 40 described with respect to FIG. 2 is implemented using microprocessor 124 from FIG. 3. The traffic associated with network processing system 40 from FIG. 2 is received by the appropriate line interface 126 sent to the corresponding processing engine 44 or 46, where it is recognized and, if necessary, pulled from the fast-path. The traffic is then sent to microprocessor 124 where it is processed and the appropriate steps are taken as discussed with reference to FIG. 2 and FIGS. 4 and 5 below.

Figure 4:
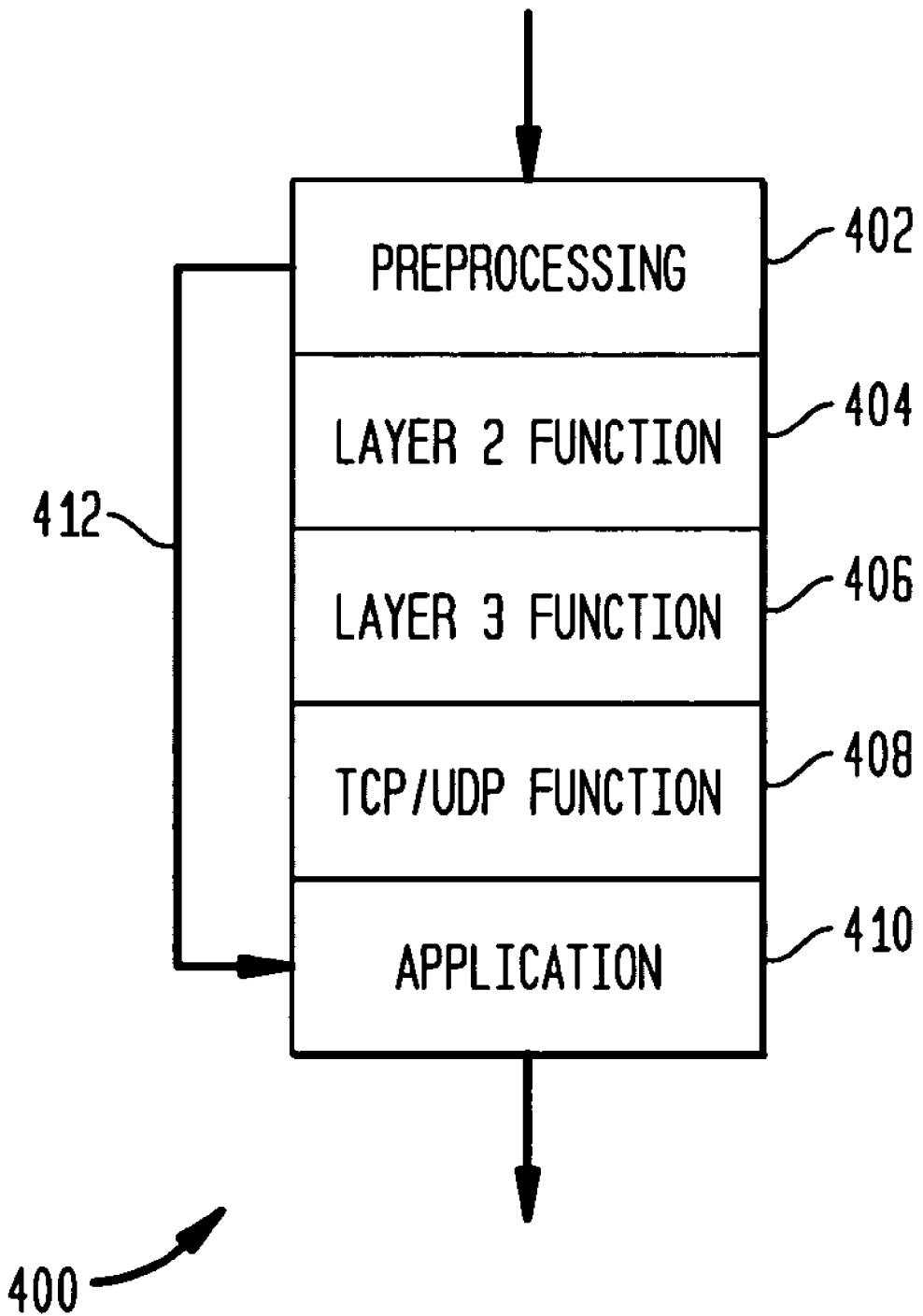
FIG. 4 is a block diagram of software modules run by the network processing system of FIG. 3.

Referring now to FIG. 4, the processing flow of software running on one or more of the processor of network processing system 40 from FIG. 3 is shown. Flows processed by network processing system 40 pass through and are processed by various software modules, shown here as software flow 400. Each discreet packet in a flow is first processed by preprocessing function 402, which performs initial processing on the packet. The packet is then passed to the layer two function or stack 404 where the layer two headers are processed. Layer two in the open systems interconnect reference model is the link layer and manages the flow of data between user and network. Ethernet is an example of a layer two protocol.

Once the layer two information has been processed, the packet is then passed to the layer three function, or stack, 406 where the network layer information in the packet header is processed. Source and destination addresses and ports and routing information are examples of layer three information. The packet is then passed to the TCP/UDP function where TCP and UDP flow information is processed. Finally, the packet is passed, if appropriate, to an application. The application can be any network application, here reference will be made to voice-over-IP applications such as SIP, H.323, and MGCP.

Layer two stacks, layer 3 stacks, and TCP/UDP stacks are well known in the art and standard for processing network traffic. It is these traditional applications, however, that provide the problem when it comes to handling overlapping private IP addresses in layer two tunneling protocol networks such as VPNs and VLANs. Layer two tunneling protocols provide identifying information in the layer two header that provides the layer two network switches to properly switch the VPN traffic. Layer two switching is relatively inexpensive to perform but each switch must know the address of every device attached to the layer two network. As a result, layer two switching does not scale and is only feasible for small private networks.

Layer three routing on the other hand, while more expensive to implement, scales very well since each router in a layer three routed network need not know every address on the network but only next-hop information based on a portion of the layer three address. Unfortunately, since VPN, and other layer two tunneling protocols, have their identifying information in the layer two header, which is stripped off by layer two stack 404, the layer three stack only sees the unroutable private IP address which may very well not be unique if there are multiple VPNs connected to the same network.

Network processing system 40 of FIG. 2 can be configured to handle this problem in one of three methods. In the first method, preprocessing function 402 identifies the packet as belonging to a real-time flow, such as VoIP, and coming from or intended for a private address on a VPN. The packets belonging to such a flow bypass the layer two stack, layer three stack and TCP/UDP stack and are sent directly to the application layer which is programmed to perform the anchoring and mapping described with reference to FIG. 2. Since the layer two stack has been bypassed the layer identifying information for the layer two tunneling protocol is intact and can be used by the application to perform a three-to-two mapping and anchoring function, mapping the private IP address and port, along with the identifying information for the layer two tunneling protocol network to a public IP address and port from the pool of public IP address and port available to the network processing system 40 of FIG. 2. With the mapping and anchoring function in place, network processing system 40 can successfully process overlapping private IP addresses from multiple layer two tunneling protocol network.

The second method in which the problem may be handled is to modify the layer two stack to pass the identifying information for the layer two tunneling protocol network to the layer three stack. The layer three stack can then be modified, once the identifying information is available to it, to perform mapping and anchoring using the three-to-two mapping of private IP address and port, VPN/VLAN identifying information to a public IP address and port from the network processing systems pool.

Finally, the third method involves modifying the hardware forwarding tables that reside in traffic flow scanning engine 140 from FIG. 3. Currently, information in the hardware forwarding tables is arranged in a manner resembling:

| Tunnel ID | Route | Next Hop info | Mods |
| --- | --- | --- | --- |

Where tunnel id refers to the layer two tunneling protocol id, route is based on the destination IP address, next hop contains the next hop routing information, and mods refers to the modifications to be made to the header information of the packet being processed.

To handle the problem created by overlapping private IP addresses, the hardware forwarding table can be modified in traffic flow scanning engine 140 of network processing system 40. Instead of the hardware forwarding table above, the table can be modified as follows:

| Virtual IP | Route | Next Hop info | Mods |
| --- | --- | --- | --- |

As can be seen the Tunnel Id has been replaced by a virtual IP address where the virtual IP address is obtained by network processing system 40 by mapping the tunnel id and source IP address from the packet header to a virtual IP address and then inserting the virtual IP address into the hardware forwarding tables in place of the tunnel ids.

Figure 5:
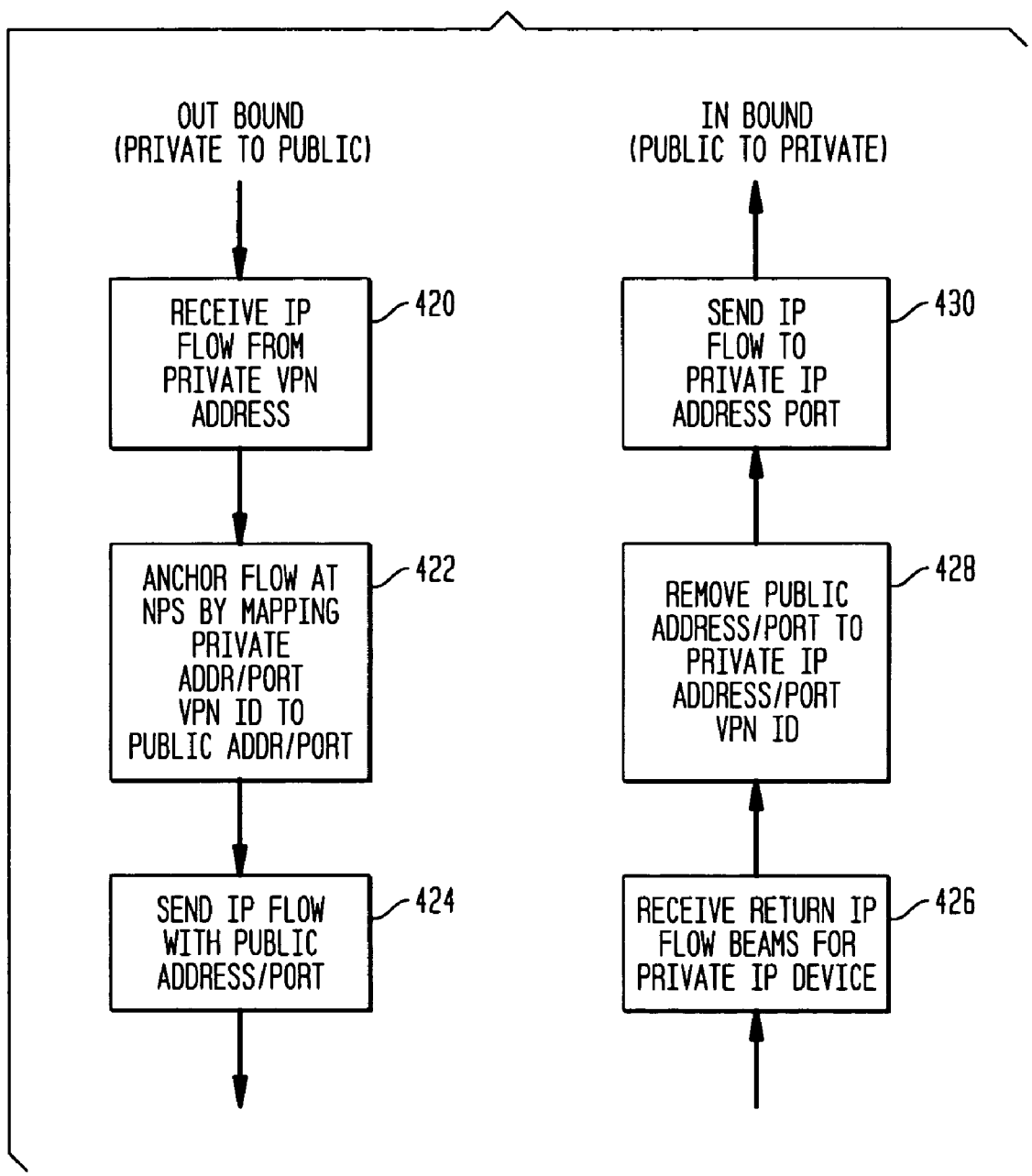
FIG. 5 is a flow chart showing the processing of an inbound and outbound IP packet/flow based on the principles of the present invention.

Referring now to FIG. 5, a method implementing the anchoring and mapping shown in FIG. 4 is described. The method begins at block 420 where a packet belonging to a particular IP flow associated with a layer two tunneling protocol network is received by the network processing system. The method then passes to block 422 where the private IP address and port as well as the identifying information from the layer two tunneling protocol network are used to map to a public IP address and port from the pool of public IP addresses and ports available to the network processing system. The flow is then placed back on the network with the mapped public IP address and port in the header and payload as required by the particular application, as shown in block 424.

Block 426 shows a return flow being received at the network processing system, where block 428 shows the public IP address and port being remapped back into the private IP address and port and identifying information for the associated layer two tunneling protocol network. The flow is then placed back onto the layer two tunneling protocol network for routing back to the private IP address and port of the originating device. While FIG. 5 has been described with reference to a flow originating at the device on the layer two tunneling protocol network, one skilled in the art would easily recognize that the method of FIG. 5 could be practiced with the flow originating on the public side of the network, though the registration processes described in FIG. 2 may be required.

Figure 6:
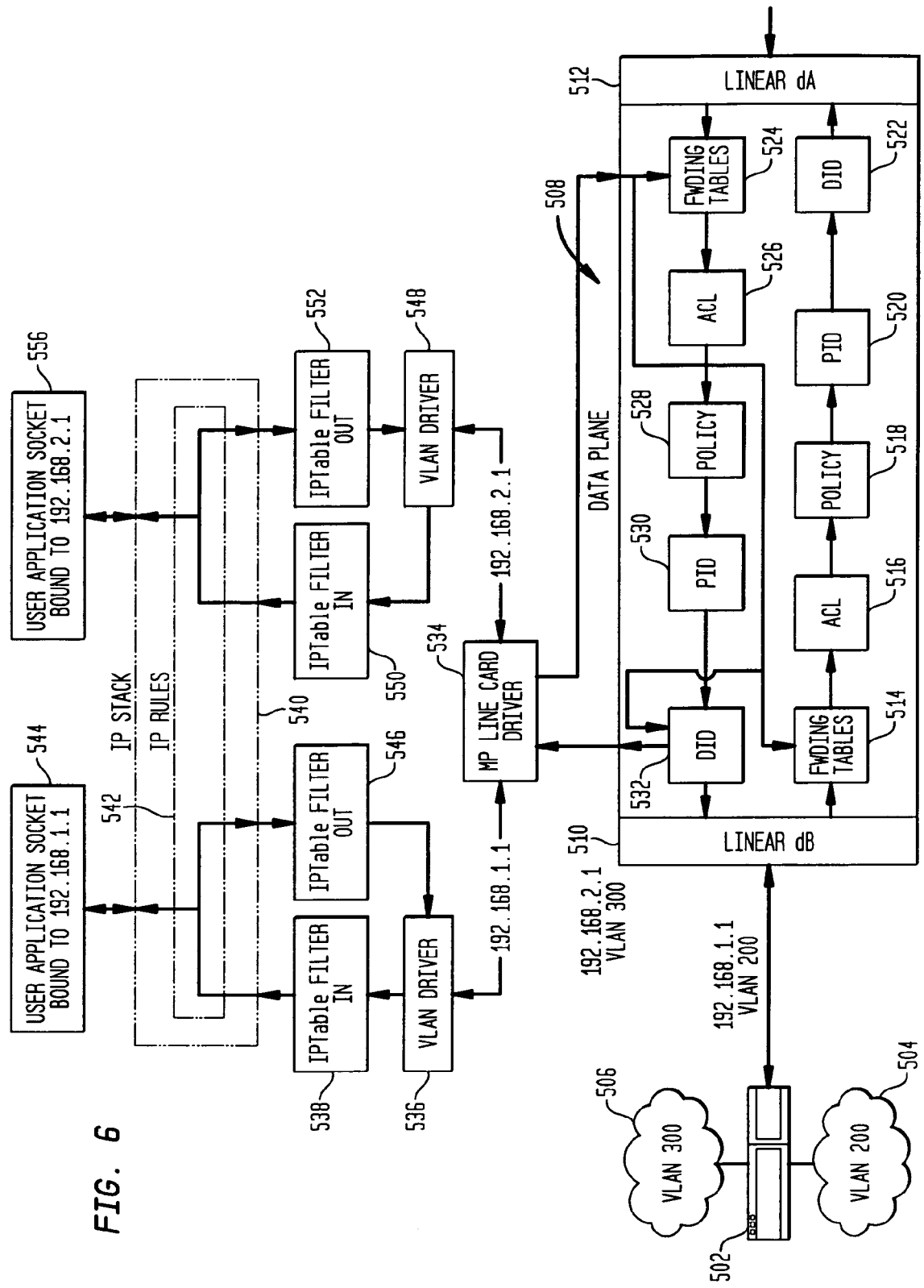
FIG. 6 is a block diagram of an embodiment of the software in the network processing system in accordance with the present invention.

Referring now to FIG. 6 a block diagram of the flow of VPN traffic through the internal software in network processing system 40 from FIG. 2 is shown. While FIG. 6 will be described with reference to an inbound voice-over-IP call, one skilled in the art will easily recognize that the description applies to any layer two tunneling protocol and that the direction of any signal referenced herein could have a counterpart in the opposite direction. Also, in discussing FIG. 6 reference will be made to reference numbers and the description from FIGS. 2 and 3.

VLAN 200, shown by network 504, and VLAN 300, shown by network 506, connect to the software data plane 508 of network processing system 40, as described with reference to FIG. 3, through router 502. Outbound traffic from either VLAN 200 or VLAN 300 enters data plane 508 through line card 510 which serves as the network interface to data plane 508. The outbound traffic then passes though the outbound portion of data plan 508 which includes forwarding tables 514, access control list 516, policy block 518, PID 520, and DID 522. Forwarding tables 514 and access control lists 516 help determine routing information for the outbound traffic, while policy block 518 is used to apply programmed policies to the traffic, which can include such policies as bandwidth or session management. PID 520 and DID 522 collect information on the traffic related to policy enforcement and statistical information.

Traffic that requires processing outside data plan 508, such as traffic belonging to applications such as VoIP calls, are routed out of data plan 508 to MP line card driver 534 which manages traffic flowing between data plan 508 and microprocessor 124 from FIG. 3. Each VLAN supported by network processing system 40 has its own VLAN driver, shown here as VLAN driver 536 for VLAN 200 and VLAN driver 548 for VLAN 300. Traffic for each VLAN is sent to its appropriate driver and then sent to IP Table Filter IN 538 and 550 which filter the traffic before it is passed to IP stack 540. IP stack 540 and IP rules 542 operate too process the traffic as appropriate, as described with reference to FIG. 4, and pass the traffic on to user application socket 544 and 556, where application specific processing occurs. The traffic is then passed back through IP stack 540 to IP Table filter OUT 546 and 552, trough VLAN drivers 536 and 548 and back to MP line card 534 where it is place back into data plane 508 for transmission through line card 512.

Inbound traffic passes though the inbound side of data plan 508 which includes forwarding tables 524, access control lists 526, Policy block 528, PID 530 and DID 532. Traffic requiring processing by microprocessor 124 from FIG. 3 is passed to MP line card driver 534 and through the same elements as described above for outbound traffic.

The description of FIG. 6 is only intended to serve as an example of the data flow through the internal software layers of network processing system 40. One skilled in the art would recognize that different applications, network configurations, data types, etc., would change the exact modules and path through which the data would pass. The description of FIG. 6 is not meant to be limiting, and all other applications, network configurations, data types, etc. are within the scope of the present invention.

While the header preprocessor, the QoS processors, and the flow management processor described with reference to FIG. 3 can be any suitable processor capable of executing the described functions, in the preferred embodiment the header preprocessor is the Fast Pattern Processor (FPP), the QoS processor is the Routing Switch Processor (RSP), and the flow management processor is the ASI processor, all manufactured by the Agere Division of Lucent Technologies, Austin Tex. The microprocessor described with reference to FIG. 3 and the management module of FIG. 4 could be any suitable microprocessor including the PowerPC line of microprocessors from Motorola, Inc., or the X86 or Pentium line of microprocessors available from Intel Corporation. Although particular references have been made to specific protocols such as SIP, H323, or MGCP, implementations and materials, those skilled in the art should understand that the network processing system can function independent of protocol, and in a variety of different implementations without departing from the scope of the invention.

Although the present invention has been described in detail, those skilled in the art should understand that they can make various changes, substitutions and alterations herein without departing from the spirit and scope of the invention in its broadest form.

We claim:

1. A method for resolving overlapping internet protocol addresses in an internet protocol packet switched network comprising:
   receiving flows from private addresses and ports on more than one layer two tunneling protocol networks;
   selecting, during initial mapping, at least one public address from a pool of public addresses usable on the packet switched network;
   initially mapping the private addresses and ports to the selected at least one public address and port using the layer three source addresses and source ports of the flows with identifying information for the layer two tunneling protocol networks;
   wherein the initial mapping is achieved by bypassing layer two and layer three processing applications for the flows from layer two tunneling networks and using the identifying information for the layer two tunneling protocols to perform the mapping in an application.

2. The method of claim 1 wherein the application is a voice-over-Internet Protocol application.

3. The method of claim 2 wherein the voice-over-Internet Protocol application is a session initiation protocol application.

4. The method of claim 1 the layer two tunneling protocol is a multi-protocol label switching virtual private network.

5. The method of claim 1 wherein devices with private interne protocol addresses preregister with a registrar thereby allowing communications from the public network to reach the devices.

6. A network processing system in an internet protocol packet switched network which includes one or more networks employing layer two tunneling protocols, the one or more networks having overlapping private internet protocol addresses, the network processing system comprising:
   one or more processors operable to run applications including a layer two function, a layer three function and an application function, wherein the functions are operable to map flows employing the layer two tunneling protocols to public internet protocol addresses by mapping a private source address and port along with identifying information for the layer two tunneling protocol network associated with the flow to a public internet protocol address and port;
   wherein flows associated with a layer two tunneling protocol network initially bypass the layer two function and layer three function and the mapping is performed by the application function, the application function is further configured to:
   select the public internet protocol address from a pool of public internet protocol addresses usable on the packet switched network;
   receive flows from private addresses and ports on more than one layer two tunneling protocol networks; and
   initially map the private source address and port to the public internet protocol address and port by bypassing layer two and layer three processing and by using the identifying information for the layer two tunneling protocols to perform the mapping in an application.

7. The network processing system of claim 6 wherein the layer two tunneling protocol network is a virtual private network.

8. The network processing system of claim 6 wherein the layer two tunneling protocol network utilizes multi-protocol label switching.

9. The network processing system of claim 6 wherein the application function is a voice-over-Internet Protocol application.

10. The network processing system of claim 9 wherein the voice-over-Internet-Protocol application uses session initiation protocol messaging.

11. A method for resolving overlapping internet protocol addresses in an internet protocol packet switched network comprising:
   receiving a flow from a first private address and port on a first layer two tunneling protocol network, wherein the flow is intended for a destination address on a second layer two tunneling protocol network;
   mapping the first private address and port using the layer three source address and source port of the flow with identifying information for the first layer two tunneling protocol network to map to a selected public address and port;
   mapping the destination address on the second layer two tunneling protocol network to a second private address and port routable on the second layer two tunneling protocol network, the mapping is initially achieved by bypassing layer two and layer three processing applications for the flows from layer two tunneling networks and using the identifying information for the layer two tunneling protocols to perform the mapping in an application; and
   selecting, during initial mapping, the public address from a pool of public addresses usable on the packet switched network.

12. The method of claim 11 wherein the application is a voice-over-Internet Protocol application.

13. The method of claim 12 wherein the voice-over-Internet Protocol application is a session initiation protocol application.

14. The method of claim 11 the layer two tunneling protocol is a multi-protocol label switching virtual private network.

* * * * *